United States Patent
Wada

(10) Patent No.: US 8,238,044 B2
(45) Date of Patent: Aug. 7, 2012

(54) IMAGING LENS, IMAGING APPARATUS, AND METHOD FOR MANUFACTURING IMAGING LENS

(75) Inventor: Mitsuaki Wada, Tokyo (JP)

(73) Assignee: Nikon Corporation, Tokyo (JP)

( * ) Notice: Subject to any disclaimer, the term of this patent is extended or adjusted under 35 U.S.C. 154(b) by 97 days.

(21) Appl. No.: 12/938,641

(22) Filed: Nov. 3, 2010

(65) Prior Publication Data
US 2011/0109979 A1 May 12, 2011

(30) Foreign Application Priority Data
Nov. 7, 2009 (JP) ................................. 2009-255596

(51) Int. Cl.
*G02B 9/34* (2006.01)
(52) U.S. Cl. ........ 359/773; 359/683; 359/686; 359/715; 359/740
(58) Field of Classification Search .......... 359/683–686, 359/715, 740, 773
See application file for complete search history.

(56) References Cited

U.S. PATENT DOCUMENTS

| | | | |
|---|---|---|---|
| 6,359,739 B1 | 3/2002 | Sensui | |
| 6,891,684 B2 | 5/2005 | Taki | |
| 7,589,909 B2 * | 9/2009 | Ikeda | 359/688 |
| 7,898,744 B2 * | 3/2011 | Wada | 359/686 |
| 2008/0225406 A1 | 9/2008 | Wada | |

FOREIGN PATENT DOCUMENTS

| | | |
|---|---|---|
| JP | 3-278012 A | 12/1991 |
| JP | 2001-021798 A | 1/2001 |
| JP | 3168424 B2 | 3/2001 |
| JP | 2003-329924 | 11/2003 |
| JP | 2004-61680 A | 2/2004 |
| JP | 2005-4041 A | 1/2005 |
| JP | 2008-257200 A | 10/2008 |

* cited by examiner

*Primary Examiner* — Evelyn A. Lester
(74) *Attorney, Agent, or Firm* — Miles & Stockbridge P.C.

(57) ABSTRACT

An imaging lens SL installed into such as an electronic still camera 1 includes, in order from an object side: a first lens group G1 having positive refractive power; a second lens group G2 having negative refractive power; a third lens group G3 having positive refractive power; and a fourth lens group G4 having positive refractive power; the second lens group G2 and the third lens group G3 move along an optical axis upon focusing from infinity to a close object, and a given conditional expression is satisfied, thereby providing a fast imaging lens capable of taking a picture from infinity to a close object with high optical performance, an optical apparatus equipped with the imaging lens, and a method for manufacturing the imaging lens.

21 Claims, 13 Drawing Sheets

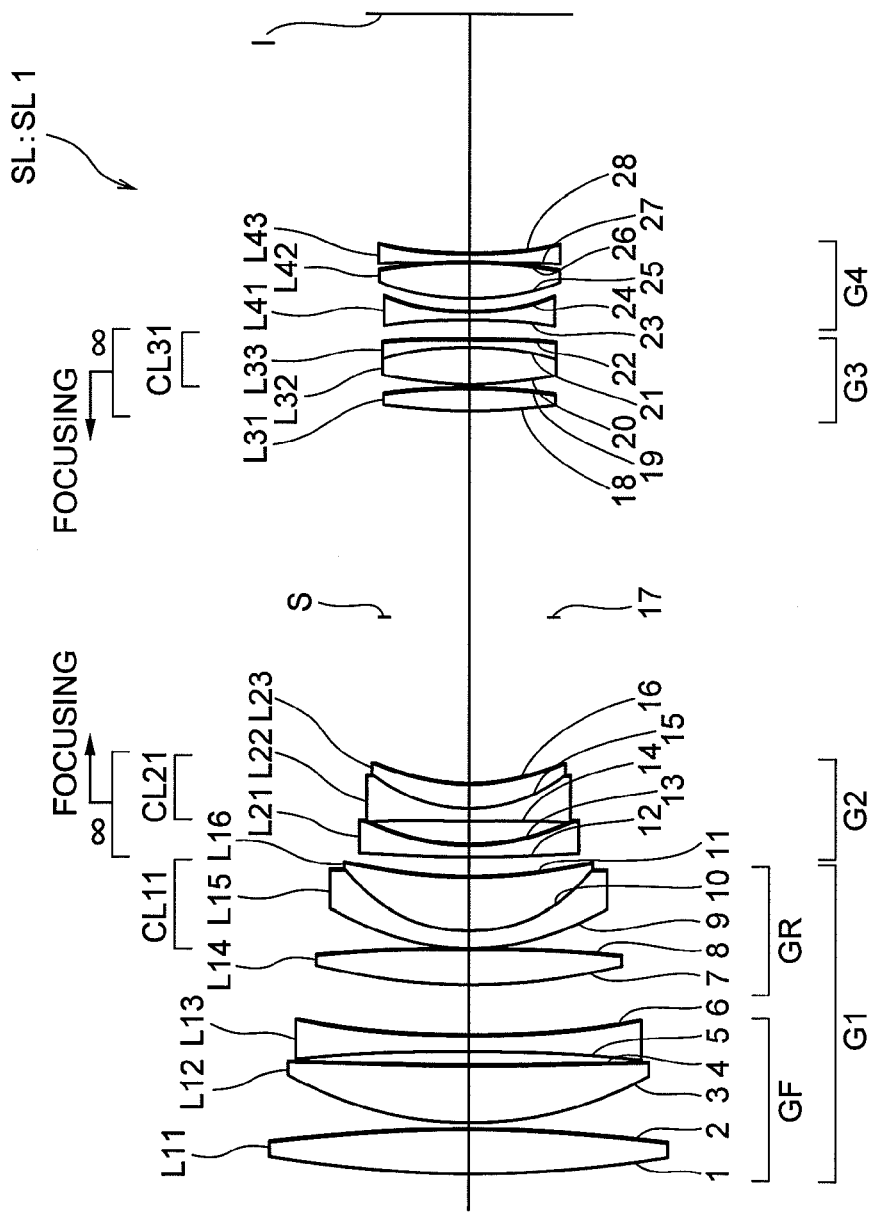

FIG.4A
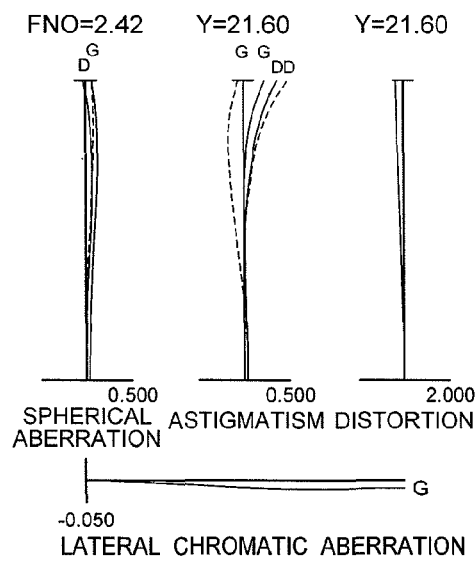
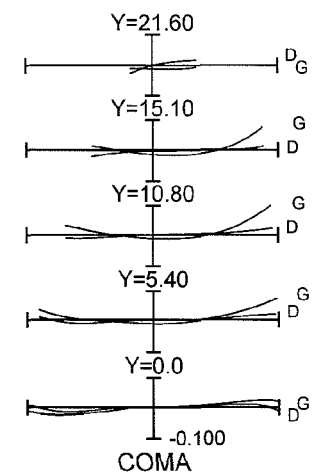
FIG.4B
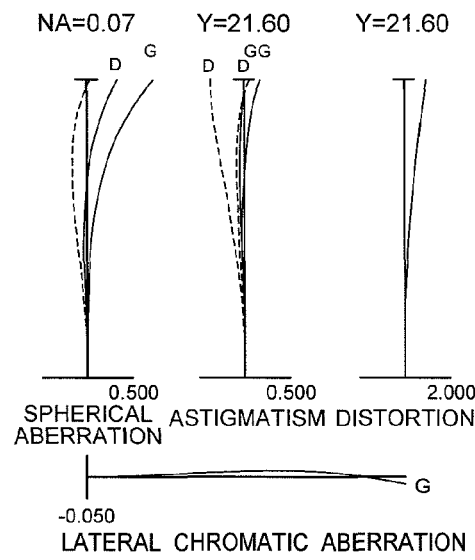
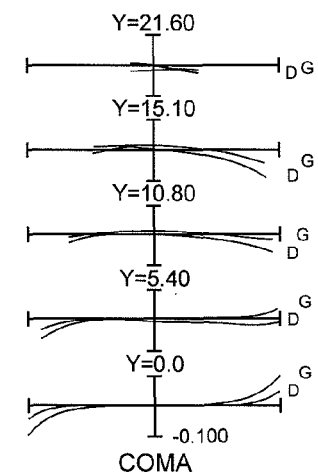
FIG.4C
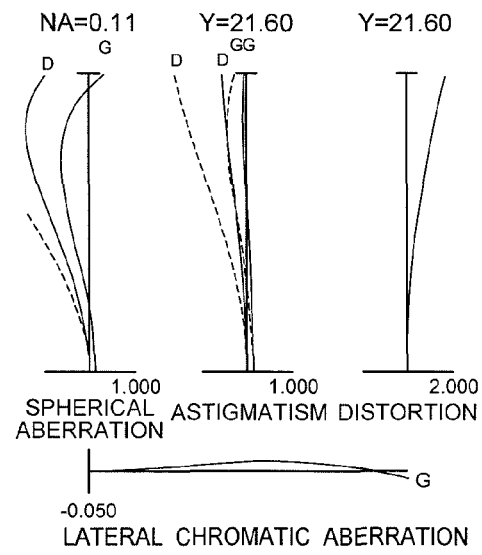
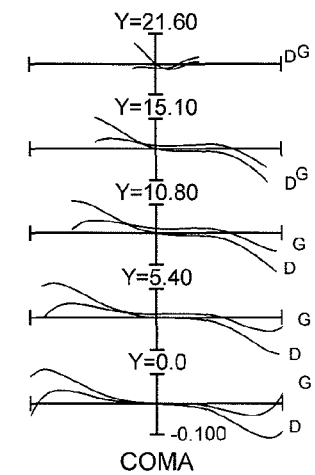

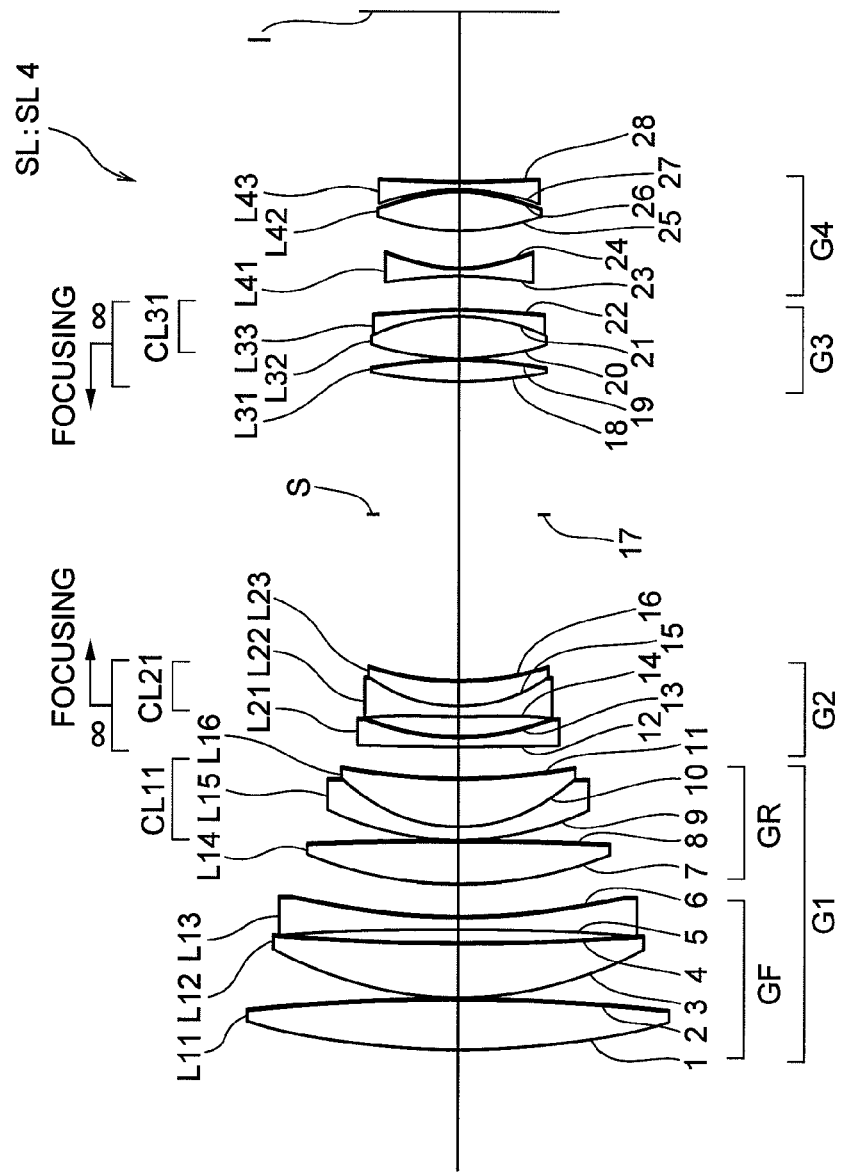

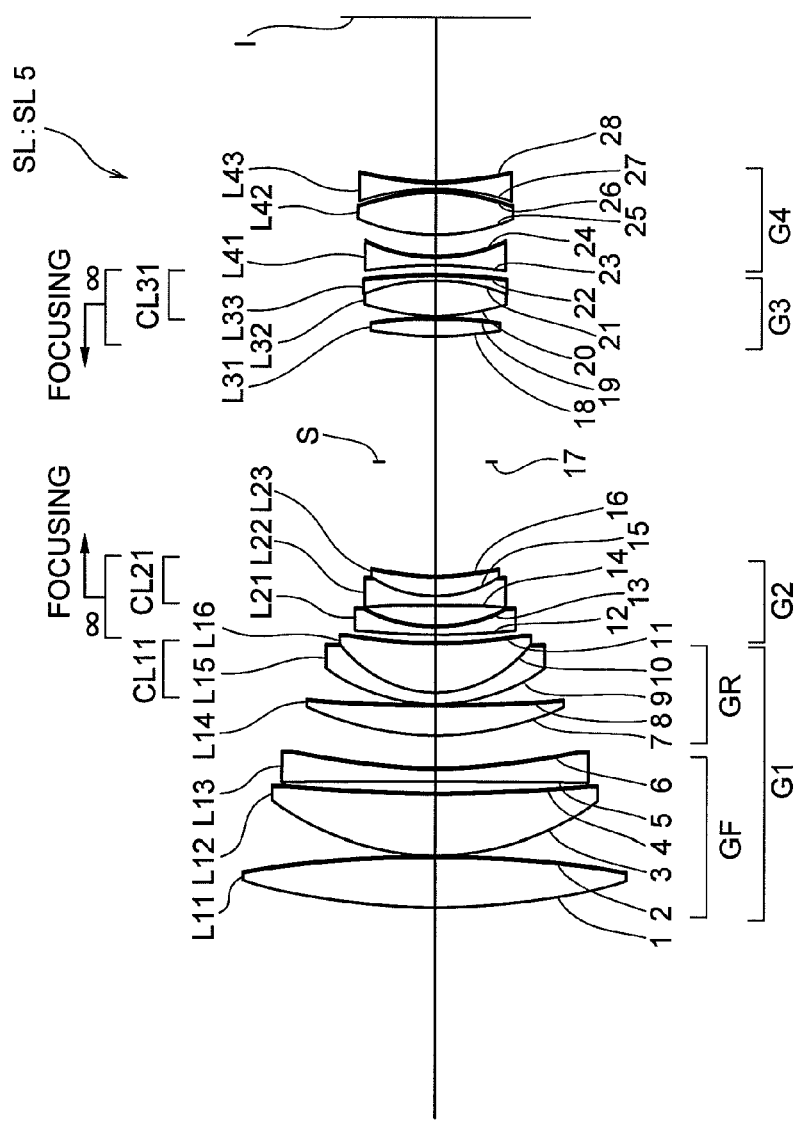

IMAGING LENS, IMAGING APPARATUS, AND METHOD FOR MANUFACTURING IMAGING LENS

The disclosure of the following priority application is herein incorporated by reference: Japanese Patent Application No. 2009-255596 filed on Nov. 7, 2009.

BACKGROUND OF THE INVENTION

1. Field of the Invention

The present invention relates to an imaging lens, an optical apparatus equipped with the imaging lens, and a method for manufacturing the imaging lens.

2. Related Background Art

There has been proposed an imaging lens suitable for a film camera, an electronic still camera and a video camera in such as Japanese Patent Application Laid-Open No. 2001-021798.

However, further high optical performance has been required to the conventional imaging lens.

SUMMARY OF THE INVENTION

The present invention is made in view of the above described desire and has an object to provide a fast imaging lens capable of taking a picture from infinity to a close object with high optical performance, an optical apparatus equipped with the imaging lens, and a method for manufacturing the imaging lens.

According to a first aspect of the present invention, there is provided an imaging lens comprising, in order from an object side: a first lens group having positive refractive power; a second lens group having negative refractive power; a third lens group having positive refractive power; and a fourth lens group having negative refractive power; the second lens group and the third lens group moving along an optical axis upon focusing from infinity to a close object, and the following conditional expression (1) being satisfied:

$$1.20 < ((-\beta)/FNO) \times (f/(-f2)) < 3.00 \quad (1)$$

where β (negative) denotes an available shooting magnification whose absolute value gives the maximum value, f denotes a focal length of the imaging lens, FNO denotes an f-number, and f2 denotes a focal length of the second lens group.

In the first aspect of the present invention, it is preferable that the first lens group includes an object side positive lens disposed to the most object side, and the following conditional expressions (2) and (3) being satisfied:

$$1.565 < nd1 \quad (2)$$

$$45.0 < vd1 \quad (3)$$

where nd1 denotes a refractive index of the object side positive lens at d-line (wavelength λ=587.6 nm), and vd1 denotes an Abbe number of the object side positive lens at d-line.

In the first aspect of the present invention, it is preferable that the first lens group includes at least one image side positive lens having positive refractive power disposed to an image side of the object side positive lens, and the following conditional expression (4) is satisfied:

$$79.0 < vd2 \quad (4)$$

where vd2 denotes an Abbe number of each of the image side positive lens.

In the first aspect of the present invention, it is preferable that the first lens group has at least one lens that is disposed second or later in order from the object side and is the image side positive lens.

In the first aspect of the present invention, it is preferable that the second lens counted in order from the object side of the first lens group is the image side positive lens.

In the first aspect of the present invention, it is preferable that the first lens group includes two image side positive lenses.

In the first aspect of the present invention, it is preferable that the first lens group includes at least one cemented lens.

In the first aspect of the present invention, it is preferable that the cemented lens includes a positive lens and a negative lens.

In the first aspect of the present invention, it is preferable that the first lens group includes, in order from the object side, a first lens having positive refractive power, a second lens group having positive refractive power, a third lens group having negative refractive power, a fourth lens group having positive refractive power, a fifth lens group having negative refractive power, and a sixth lens group having positive refractive power.

In the first aspect of the present invention, it is preferable that the following conditional expression (6) is satisfied:

$$0.15 < fGF/fGR < 2.00 \quad (6)$$

where fGF denotes a focal length of a front lens group, and fGR denotes a focal length of a rear lens group, in which the front lens group includes the first lens, the second lens, and the third lens in the first lens group, and the rear lens group includes the fourth lens, the fifth lens, and sixth lens in the first lens group.

According to a second aspect of the present invention, there is provided an optical apparatus including the imaging lens according to the first aspect.

According to a third aspect of the present invention, there is provided a method for manufacturing an imaging lens including, in order from an object side, a first lens group having positive refractive power, a second lens group having negative refractive power, a third lens group having positive refractive power, and a fourth lens group having negative refractive power, the method comprising steps of: disposing the second lens group and the third lens group movable along an optical axis upon focusing from infinity to a close object; and disposing each lens group with satisfying the following conditional expression (1):

$$1.20 < ((-\beta)/FNO) \times (f/(-f2)) < 3.00 \quad (1)$$

where β (negative) denotes an available shooting magnification whose absolute value gives the maximum value, f denotes a focal length of the imaging lens, FNO denotes an f-number, and f2 denotes a focal length of the second lens group.

In the third aspect of the present invention, a following step is preferably included:

disposing an object side positive lens having positive refractive power to the most object side in the first lens group with satisfying the following conditional expressions (2) and (3):

$$1.565 < nd1 \quad (2)$$

$$45.0 < vd1 \quad (3)$$

where nd1 denotes a refractive index of the object side positive lens at d-line (wavelength λ=587.6 nm), and vd1 denotes an Abbe number of the object side positive lens at d-line.

In the third aspect of the present invention, a following step is preferably included:

disposing at least one image side positive lens having positive refractive power to the image side of the object side positive lens in the first lens group with satisfying the following conditional expression (4):

$$79.0<vd2 \quad (4)$$

where vd2 denotes an Abbe number of each of the image side positive lens.

In the third aspect of the present invention, a following step is preferably included:

disposing at least one image side positive lens to the second or later in order from the object side in the first lens group.

In the third aspect of the present invention, a following step is preferably included:

disposing the image side positive lens to the second, in order from the object side, of the first lens group.

In the third aspect of the present invention, a following step is preferably included:

disposing two image side positive lens in the first lens group.

In the third aspect of the present invention, a following step is preferably included:

disposing at least one cemented lens in the first lens group.

In the third aspect of the present invention, a following step is preferably included:

disposing a positive lens and a negative lens in the cemented lens.

In the third aspect of the present invention, a following step is preferably included:

disposing, in order from the object side, a first lens having positive refractive power, a second lens having positive refractive power, a third lens having negative refractive power, a fourth lens having positive refractive power, a fifth lens having negative refractive power, and a sixth lens having positive refractive power in the first lens group.

In the third aspect of the present invention, a following step is preferably included:

satisfying the following conditional expression (6):

$$0.15<fGF/fGR<2.00 \quad (6)$$

where fGF denotes a focal length of a front lens group, and fGR denotes a focal length of a rear lens group, in which the front lens group includes the first lens, the second lens, and the third lens in the first lens group, and the rear lens group includes the fourth lens, the fifth lens, and sixth lens in the first lens group.

With constructing an imaging lens, an optical apparatus equipped with the imaging lens, and a method for manufacturing the imaging lens according to the present invention in this manner, it becomes possible to obtain a fast imaging lens capable of taking a picture from infinity to a close object with high optical performance.

BRIEF DESCRIPTION OF THE DRAWINGS

FIG. 1 is a sectional view showing a lens configuration of an imaging lens focusing on infinity according to Example 1 of the present application.

FIGS. 2A, 2B and 2C are graphs showing various aberrations of the imaging lens according to Example 1, in which FIG. 2A is upon focusing on infinity, FIG. 2B is upon focusing on an intermediate shooting distance, and FIG. 2C is upon focusing on a closest shooting distance.

FIGS. 4A, 4B and 4C are graphs showing various aberrations of the imaging lens according to Example 2, in which FIG. 4A is upon focusing on infinity, FIG. 4B is upon focusing on an intermediate shooting distance, and FIG. 4C is upon focusing on a closest shooting distance.

FIGS. 6A, 6B and 6C are graphs showing various aberrations of the imaging lens according to Example 3, in which FIG. 6A is upon focusing on infinity, FIG. 6B is upon focusing on an intermediate shooting distance, and FIG. 6C is upon focusing on a closest shooting distance.

FIG. 7 is a sectional view showing a lens configuration of an imaging lens focusing on infinity according to Example 4 of the present application.

FIGS. 8A, 8B and 8C are graphs showing various aberrations of the imaging lens according to Example 4, in which FIG. 8A is upon focusing on infinity, FIG. 8B is upon focusing on an intermediate shooting distance, and FIG. 8C is upon focusing on a closest shooting distance.

FIG. 9 is a sectional view showing a lens configuration of an imaging lens focusing on infinity according to Example 5 of the present application.

FIGS. 10A, 10B and 10C are graphs showing various aberrations of the imaging lens according to Example 5, in which FIG. 10A is upon focusing on infinity, FIG. 10B is upon focusing on an intermediate shooting distance, and FIG. 10C is upon focusing on a closest shooting distance.

FIGS. 11A and 11B are diagrams showing an electronic still camera equipped with an imaging lens according to the present embodiment, in which FIG. 11A is a front view, and FIG. 11B is a rear view.

DESCRIPTION OF THE MOST PREFERRED EMBODIMENT

Figure 2A:
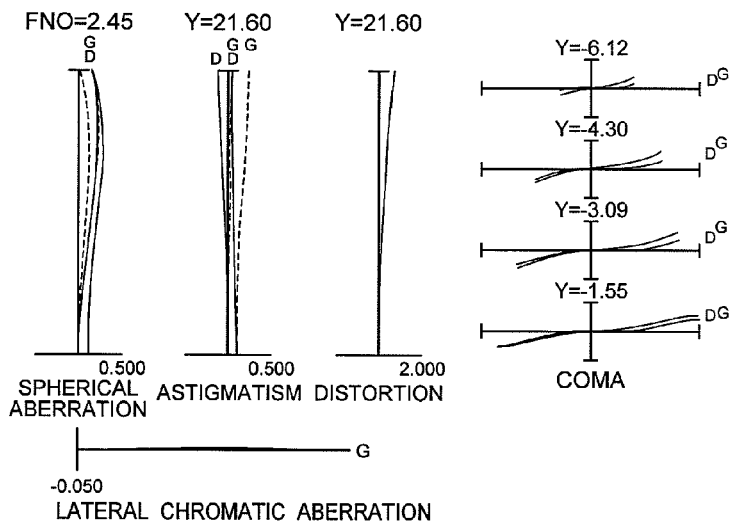

A preferred embodiment of the present application is explained below with reference to accompanying drawings. As shown in FIG. 1, an imaging lens SL according to the present embodiment includes, in order from an object side, a first lens group G1 having positive refractive power, a second lens group G2 having negative refractive power, a third lens group G3 having positive refractive power, and a fourth lens group G4 having negative refractive power.

Moreover, in an imaging lens SL according to the present embodiment, the second lens group G2 and the third lens group G3 are moved as focusing lens groups along an optical axis upon focusing from infinity to a close object. The focusing lens groups are suitable for auto focusing, and are suitable for being driven by a motor for auto focusing such as an ultrasonic motor.

In an imaging lens SL according to the present embodiment, the following conditional expression (1) is preferably satisfied:

$$1.20<((-\beta)FNO)\times(f/(-f2))<3.00 \quad (1)$$

where β (negative) denotes an available shooting magnification whose absolute value gives the maximum value, f denotes a focal length of the imaging lens, FNO denotes an f-number, and f2 denotes a focal length of the second lens group G2.

Conditional expression (1) defines an appropriate relation between a shooting magnification, a focal length of the second lens group G2, and an f-number with respect to the focal length of the imaging lens. When the value $((-\beta)/FNO)\times(f/$ (−f2)) is equal to or exceeds the upper limit of conditional expression (1), refractive power of the second lens group G2 becomes strong, and refractive power of the first lens group G1 becomes weak, so that a total lens length becomes long. Moreover, since refractive power of the second lens group becomes strong, spherical aberration and curvature of field become worse, so that it is undesirable. In order to secure the effect of the present embodiment, it is preferable to set the upper limit of conditional expression (1) to 2.50. In order to further secure the effect of the present embodiment, it is most preferable to set the upper limit of conditional expression (1) to 2.00. On the other hand, when the value ((−β)/FNO)×(f/(−f2)) is equal to or falls below the lower limit of conditional expression (1), refractive power of the second lens group G2 becomes weak, so that refractive power of the first lens group G1 becomes strong. As a result, variations in spherical aberration and the image plane upon focusing become large, so that it is undesirable. In order to secure the effect of the present embodiment, it is preferable to set the lower limit of conditional expression (1) to 1.30. In order to further secure the effect of the present embodiment, it is most preferable to set the lower limit of conditional expression (1) to 1.40.

Conditional expressions for constructing such an imaging lens SL are explained. In an imaging lens SL according to the present embodiment, an object side positive lens (L11 in FIG. 1) having positive refractive power is disposed to the most object side of the first lens group G1, and the following conditional expression (2) is satisfied:

$$1.565 < nd1 \qquad (2)$$

where nd1 denotes a refractive index of the object side positive lens L11 at d-line (wavelength λ=587.6 nm).

Conditional expression (2) defines the refractive index of the object side positive lens at d-line. When the value nd1 is equal to or falls below the lower limit of conditional expression (2), variations in spherical aberration and curvature of field upon focusing become large, so that it is undesirable. In order to secure the effect of the present embodiment, it is preferable to set the lower limit of conditional expression (2) to 1.580. Moreover, in order to further secure the effect of the present embodiment, it is preferable to set the lower limit of conditional expression (2) to 1.600.

Moreover, in an imaging lens SL according to the present embodiment, the following conditional expression (3) is preferably satisfied:

$$45.0 < vd1 \qquad (3)$$

where vd1 denotes an Abbe number of the object side positive lens at d-line.

Conditional expression (3) defines an Abbe number of the object side positive lens. When the value vd1 is equal to or falls below the lower limit of conditional expression (3), the second order aberration of the first lens group G1 becomes large, so that it is undesirable. In order to secure the effect of the present embodiment, it is preferable to set the lower limit of conditional expression (3) to 50.00. In order to further secure the effect of the present embodiment, it is most effective to set the lower limit of conditional expression (3) to 55.00. In order to further secure the effect of the present embodiment, it is most effective to set the lower limit of conditional expression (3) to 60.00.

In an imaging lens SL according to the present embodiment, the first lens group G1 preferably includes at least one image side positive lens (for example, L12 and L14 in FIG. 1) disposed to the image side of the object side positive lens, and the following conditional expression (4) is preferably satisfied:

$$79.0 < vd2 \qquad (4)$$

where vd2 denotes an Abbe number of the image side positive lens at d-line.

Conditional expression (4) defines the Abbe number of the image side positive lens. The image side positive lens is made from an anomalous dispersion glass. Such an image side positive lens is effective when it is disposed in a position where an height of ray is high, so that it is the most effective to be disposed adjoining to the image side of the object side positive lens. When the value vd2 is equal to or falls below the lower limit of conditional expression (4), secondary dispersion generated in the first lens group G1 becomes large, and longitudinal chromatic aberration on the image plane cannot be corrected, so that it is undesirable.

In order to secure the effect of the present embodiment, it is preferable to set the lower limit of conditional expression (4) to 80.0. In order to further secure the effect of the present embodiment, it is most preferable to set the lower limit of conditional expression (4) to 81.5.

In an imaging lens SL according to the present embodiment, the first lens group G1 preferably has at least one lens (for example, L12 and L14 in FIG. 1) that is disposed second or later in order from the object side and is the image side positive lens. In this case, it is further preferable that the first lens group G1 has two image side positive lenses. Moreover, the second lens counted from the object side (L12 in FIG. 1) is preferably an images side positive lens.

In an imaging lens SL according to the present embodiment, the following conditional expression (5) is preferably satisfied:

$$0.40 < (-\beta) \times (-f2) \times FNO/f < 0.90 \qquad (5)$$

where β (negative) denotes an available shooting magnification whose absolute value gives the maximum value, f denotes a focal length of the imaging lens, FNO denotes an f-number, and f2 denotes an focal length of the second lens group.

Conditional expression (5) defines an appropriate relation of the shooting magnification, the focal length of the second lens group G2, and the f-number with respect to the focal length of the imaging lens. When the value (−β)×(−f2)×FNO/f is equal to or exceeds the upper limit of conditional expression (5), refractive power of the second lens group G2 becomes weak, so that refractive power of the first lens group G1 becomes strong. Accordingly, variations in spherical aberration and the image plane upon focusing become large, so that it is undesirable. In order to secure the effect of the present embodiment, it is preferable to set the upper limit of conditional expression (5) to 0.80. In order to further secure the effect of the present embodiment, it is most preferable to set the upper limit of conditional expression (5) to 0.70.

On the other hand, when the value (−β)×(−f2)×FNO/f is equal to or falls below the lower limit of conditional expression (5), refractive power of the first lens group G1 becomes weak, so that the total lens length becomes large. Moreover, refractive power of the second lens group G2 becomes strong, and spherical aberration and curvature of field become worse, so that it is undesirable. In order to secure the effect of the present embodiment, it is preferable to set the lower limit of conditional expression (5) to 0.45. In order to further secure the effect of the present embodiment, it is most preferable to set the lower limit of conditional expression (5) to 0.50.

In an imaging lens SL according to the present embodiment, the first lens group G1 preferably includes at least one cemented lens (CL11 in FIG. 1). In this case, the cemented lens preferably has a positive lens (L16 in FIG. 1) and a negative lens (L15 in FIG. 1), thereby carrying out excellent correction of spherical aberration and achromatization.

In an imaging lens SL according to the present embodiment, the first lens group G1 preferably includes, in order from the object side, a first lens L11 having positive refractive power, a second lens L12 having positive refractive power, a third lens L13 having negative refractive power, a fourth lens L14 having positive refractive power, a fifth lens L15 having negative refractive power, and a sixth lens L16 having positive refractive power. With this lens configuration, it becomes possible to keep the f-number small with securing an optical amount.

In an imaging lens SL according to the present embodiment, when a front lens group GF is composed of the first lens L11, the second lens L12, and the third lens L13, and a rear lens group GR is composed of the fourth lens L14, the fifth lens L15, and the sixth lens L16, the following conditional expression (6) is preferably satisfied:

$$0.15 < fGF/fGR < 2.00 \quad (6)$$

where fGF denotes a focal length of the front lens group GF, and fGR denotes a focal length of the rear lens group GR.

conditional expression (6) defines an appropriate focal length of the front lens group GF with respect to the focal length of the rear lens group GR. When the ratio fGF/fGR is equal to or exceeds the upper limit of conditional expression (6), refractive power of the rear lens group GR becomes strong, and variation in longitudinal chromatic aberration upon focusing becomes large, so that it is undesirable. In order to secure the effect of the present embodiment, it is preferable to set the upper limit of conditional expression (6) to 1.80. In order to further secure the effect of the present embodiment, it is most preferable to set the upper limit of conditional expression (6) to 1.70.

On the other hand, when the ratio fGF/fGR is equal to or falls below the lower limit of conditional expression (6), refractive power of the front lens group GF becomes strong, and variation in spherical aberration upon focusing becomes large, so that it is undesirable. In order to secure the effect of the present embodiment, it is preferable to set the lower limit of conditional expression (6) to 0.20. In order to further secure the effect of the present embodiment, it is most preferable to set the lower limit of conditional expression (6) to 0.50.

Figure 11A:
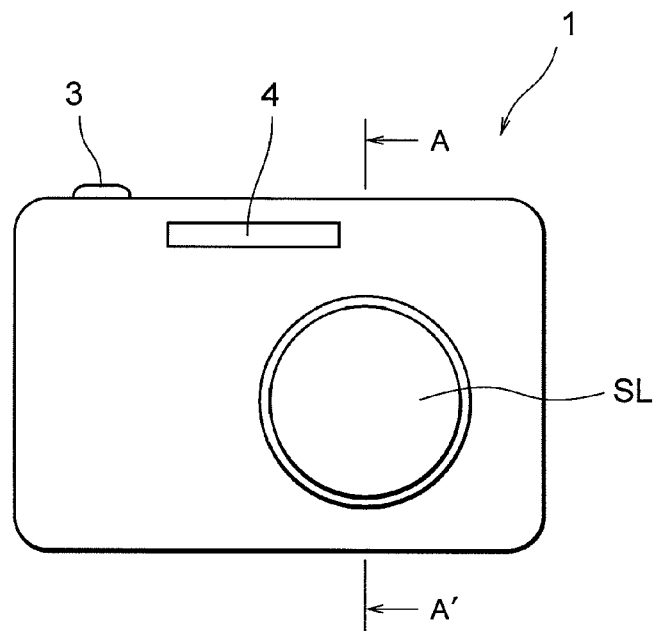
Figure 11B:
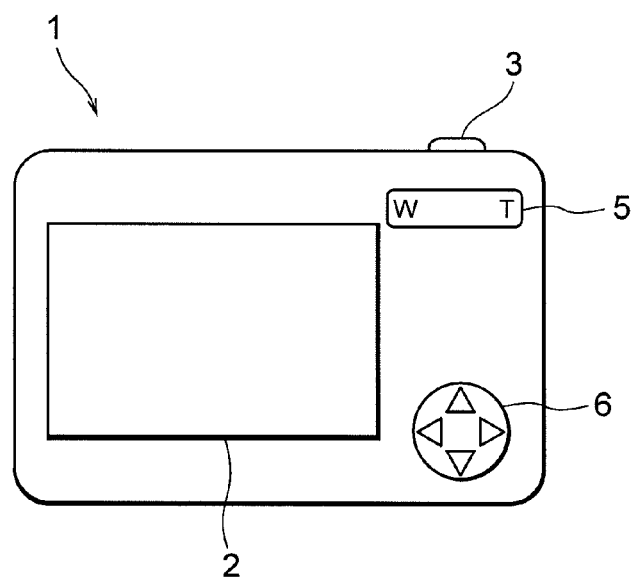
Figure 12:
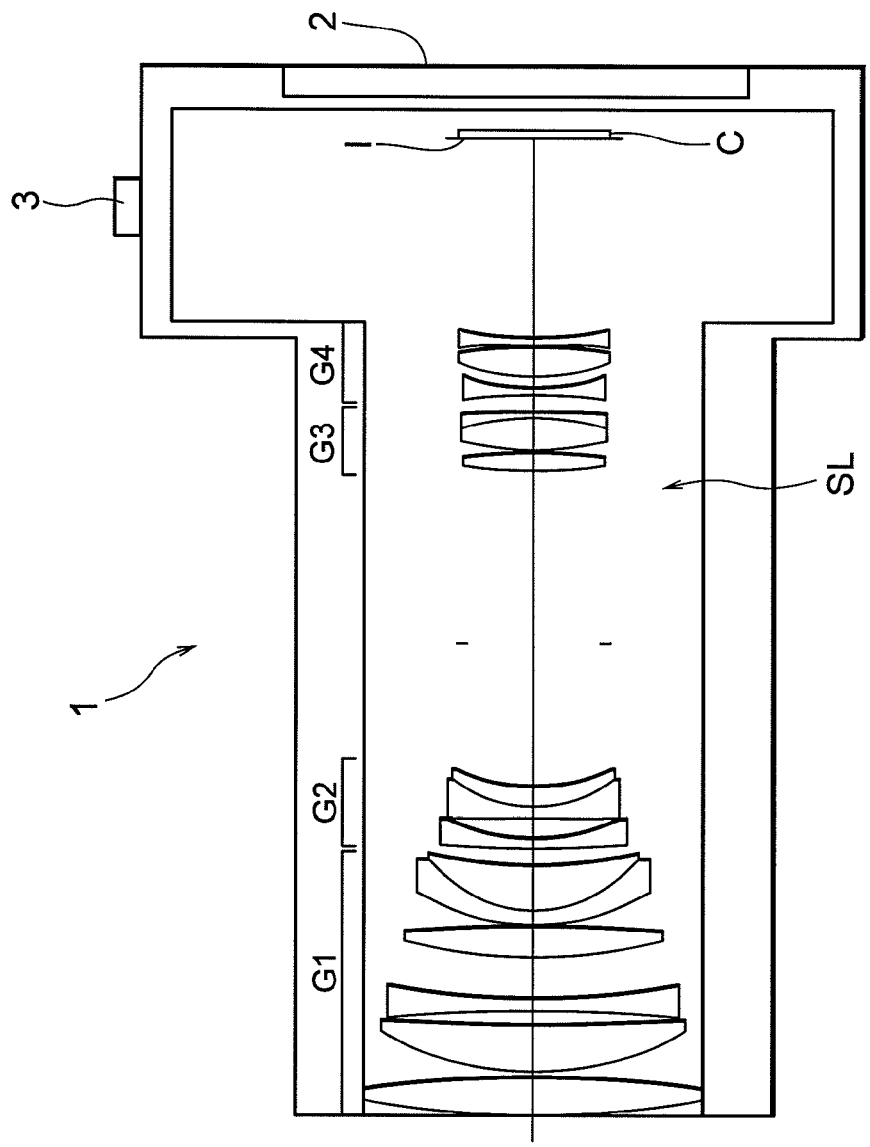
FIG. 12 is a sectional view seen along the AA' line in FIG. 11A.

In FIGS. 11A, 11B and 12, construction of an electronic still camera 1 (hereinafter simply shown as a camera) as an optical apparatus equipped with an imaging lens SL according to the present embodiment is shown. In the camera 1, when a power switch button (not shown) is pressed, a shutter (not shown) of an image-taking lens (imaging lens SL) is opened, light from an object (not shown) is converged by the imaging lens SL, and an image is formed on an imaging device C (such as a CCD, or CMOS) disposed on the image plane I. The object image formed on the imaging device C is displayed on a liquid crystal monitor 2 disposed backside of the camera 1. After fixing the image composition of the object image with observing the liquid crystal monitor 2, a photographer depresses a release button 3 to take a picture of the object image by the imaging device C, and stores in a memory (not shown).

In the camera 1, the following members are disposed such as an auxiliary light emitter 4 that emits auxiliary light when the object is dark, a W-T button 5 that makes the zoom lens system carry out zooming between a wide-angle end state (W) and a telephoto end state (T), and a function button 6 that is used for setting various conditions of the camera 1. Although a compact-type camera, in which an imaging lens SL and a camera are formed integrally, is shown in FIG. 11, an optical apparatus may be a single-lens reflex camera that a camera body and a lens barrel including an imaging lens SL are removable.

Figure 13:
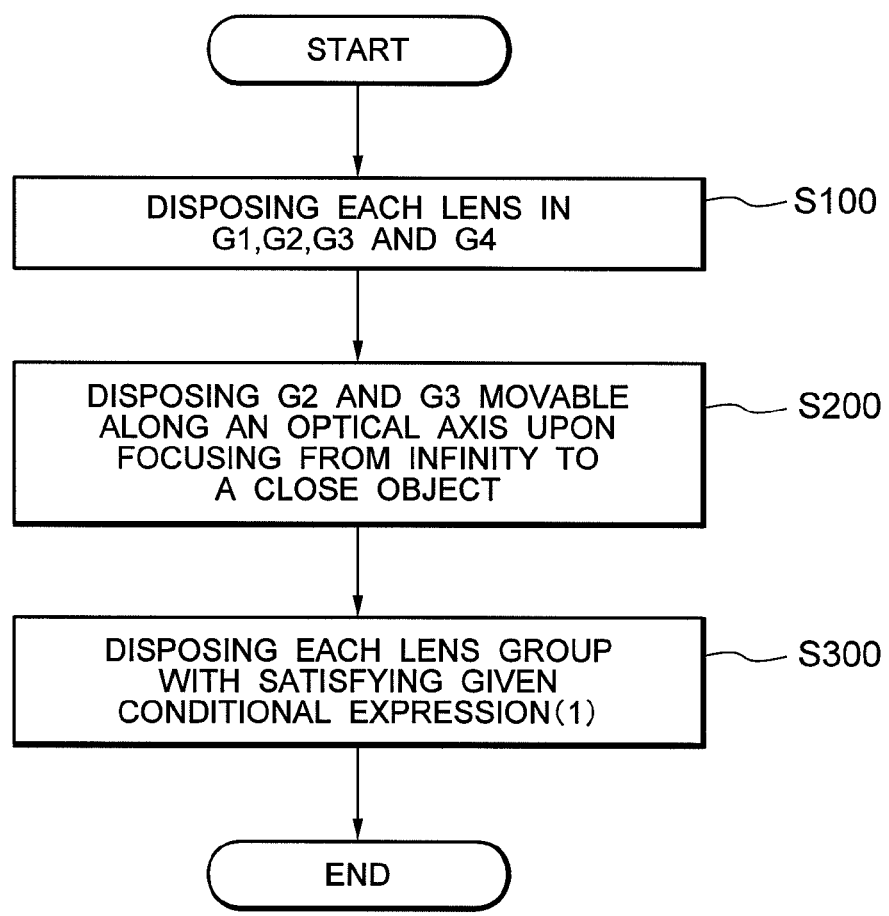
FIG. 13 is a flowchart showing a method for manufacturing an imaging lens according to the present embodiment.

Then, a method for manufacturing an imaging lens SL according to the present embodiment is explained with reference to FIG. 13.

Step S100:

Each lens group is prepared with disposing each lens into each lens group. In particular, in the present embodiment, for example, in order from an object side, a double convex positive lens L11, a positive meniscus lens L12 having a convex surface facing the object side, a double concave negative lens L13, a double convex positive lens L14, and a cemented lens CL11 constructed by a negative meniscus lens L15 having a convex surface facing the object side cemented with a positive meniscus lens L16 having a convex surface facing the object side are disposed in the first lens group G1. In order from the object side, a negative meniscus lens L21 having a convex surface facing the object side, and a cemented lens CL21 constructed by a double concave negative lens L22 cemented with a positive meniscus lens L23 having a convex surface facing the object side are disposed in the second lens group G2. In order from the object side, a double convex positive lens L31, and a cemented lens CL31 constructed by a double convex positive lens L32 cemented with a negative meniscus lens L33 having a convex surface facing the image side are disposed in the third lens group G3. In order from the object side, a double concave negative lens L41, a double convex positive lens L42, and a double concave negative lens L43 are disposed in the second lens group G4. With disposing each lens group provided in this manner, an imaging lens SL is manufactured.

Step S200:

Disposing the second lens group G2 and the third lens group G3 movably along an optical axis upon focusing from infinity to a close object.

Step S300:

Disposing each lens group with satisfying the following conditional expression (1):

$$1.20 < ((-\beta)/FNO) \times (f/(-f2)) < 3.00 \quad (1)$$

where β (negative) denotes an available shooting magnification whose absolute value gives the maximum value, f denotes a focal length of the imaging lens, FNO denotes an f-number, and f2 denotes a focal length of the second lens group G2.

Each example of the present embodiment is explained below with reference to accompanying drawings. FIGS. 1, 3, 5, 7 and 9 are sectional views showing lens configurations of imaging lenses SL (SL1 through SL5) and movement of each lens group upon focusing from infinity to a close object. As shown in each drawing, an imaging lens SL according to each example is composed of, in order from an object side, a first lens group G1 having positive refractive power, a second lens group G2 having negative refractive power, a third lens group G3 having positive refractive power, and a fourth lens group G4 having negative refractive power. In the first lens group G1, an object side positive lens L11 having positive refractive power is disposed to the most object side thereof, and an image side positive lens L12 having positive refractive power is disposed to the image side of the object side positive lens L11. The second lens group G2 and the third lens group G3 are moved along an optical axis upon carrying out focusing from infinity to a close object. An aperture stop S is disposed between the second lens group G2 and the third lens group G3.

Example 1

FIG. 1 is a sectional view showing a lens configuration of an imaging lens SL1 according to Example 1 of the present application focusing on infinity. In the imaging lens SL1 shown in FIG. 1, the first lens group G1 is composed of, in order from and object side, a double convex positive lens L11, a positive meniscus lens L12 having a convex surface facing the object side, a double concave negative lens L13, a double convex positive lens L14, and a cemented lens CL11 constructed by a negative meniscus lens L15 having a convex surface facing the object side cemented with a positive meniscus lens L16 having a convex surface facing the object side. The second lens group G2 is composed of, in order from the object side, a negative meniscus lens L21 having a convex surface facing the object side, and a cemented lens CL 21 constructed by a double concave negative lens L22 cemented with a positive meniscus lens L23 having a convex surface facing the object side. The third lens group G3 is composed of, in order from the object side, a double convex positive lens L31, and a cemented lens CL 31 constructed by a double convex positive lens L32 cemented with a negative meniscus lens L33 having a convex surface facing the image side. The fourth lens group G4 is composed of, in order from the object side, a double concave negative lens L41, a double convex positive lens L42, and a double concave negative lens L43.

Various values associated with the imaging lens SL1 according to Example 1 are listed in Table 1.

In Table 1, f denotes a focal length of the imaging lens SL1, FNO denotes an f-number, β denotes a shooting magnification, and Bf denotes a distance between an image side surface of the most image side lens and an image plane, TL denotes a total lens length. In [Lens Data], the left most column "i" shows the lens surface number counted in order from the object side, the second column "r" shows a radius of curvature of the lens surface, the third column "d" shows a distance to the next surface, the fourth column "vd" shows an Abbe number at d-line (wavelength λ=587.6 nm), and the fifth column "nd" shows refractive index at d-line (wavelength λ=587.6 nm). In the fifth column "nd" refractive index of the air nd=1.000000 is omitted. In the second column "r", r=∞ denotes a plane surface. In [Variable Distances], β, variable distances, Bf and a total lens length TL with respect to shooting distance d0 of infinity (INF), an intermediate shooting distance (MID) (β=−0.5), and a closest shooting distance (CLD) (β=−1.0) are shown. In [Values for Conditional Expressions], values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

[Specifications]

f = 199.96976
FNO = 2.46

[Lens Data]

| i | r | d | vd | nd |
|---|---|---|---|---|
| 1 | 298.1633 | 10.0000 | 58.55 | 1.651597 |
| 2 | −284.3000 | 1.0000 | | |
| 3 | 86.0789 | 12.5000 | 82.52 | 1.497820 |
| 4 | 1451.5525 | 3.0000 | | |
| 5 | −368.5872 | 3.5000 | 34.96 | 1.800999 |
| 6 | 228.3831 | 10.6267 | | |
| 7 | 159.9332 | 8.0000 | 70.41 | 1.487490 |
| 8 | −314.4280 | 0.1000 | | |
| 9 | 64.8733 | 3.5000 | 41.96 | 1.667551 |
| 10 | 35.8768 | 12.0000 | 82.52 | 1.497820 |
| 11 | 144.1260 | (d11) | | |
| 12 | 435.6646 | 2.8000 | 65.44 | 1.603001 |
| 13 | 55.4486 | 5.0000 | | |
| 14 | −455.1677 | 2.7000 | 69.98 | 1.518601 |
| 15 | 36.0015 | 5.5000 | 25.43 | 1.805181 |
| 16 | 52.6821 | (d16) | | |
| 17 | ∞ | (d17) | Aperture Stop S | |
| 18 | 144.7963 | 5.0000 | 82.52 | 1.497820 |
| 19 | −124.6815 | 0.5000 | | |
| 20 | 90.9873 | 8.0000 | 60.29 | 1.620411 |
| 21 | −68.8895 | 1.8000 | 30.13 | 1.698947 |
| 22 | −327.4296 | (d22) | | |
| 23 | −146.1501 | 2.0000 | 23.78 | 1.846660 |
| 24 | 55.0000 | 2.8562 | | |
| 25 | 62.7116 | 8.0000 | 23.78 | 1.846660 |
| 26 | −109.3188 | 0.1000 | | |
| 27 | −257.3955 | 2.0000 | 69.98 | 1.518601 |
| 28 | 105.3047 | 57.9810 | | |

[Variable Distances]

| | INF | MID | CLD |
|---|---|---|---|
| β= | 0 | −0.5 | −1.0 |
| d0= | ∞ | 377.60300 | 235.95060 |
| d11= | 4.00000 | 18.80254 | 34.77331 |
| d16= | 35.77330 | 20.97077 | 5.00000 |
| d17= | 44.74376 | 21.33048 | 5.97949 |
| d22= | 4.00000 | 27.41329 | 42.76428 |
| Bf= | 57.98100 | 58.24403 | 58.52183 |
| TL= | 249.83294 | 250.09597 | 250.37377 |

[Values for Conditional Expressions]

β = −1.0
FNO = 2.46
f = 199.96976
f2 = −53.900
(1)((−β)/FNO) × (f/(−f2)) = 1.51
(2)nd1 = 1.652
(3)vd1 = 58.55
(4)vd2 = 82.52
(5)(−β) × (−f2) × FNo/f = 0.663
(6)fGF/fGR = 1.452

Figure 2B:
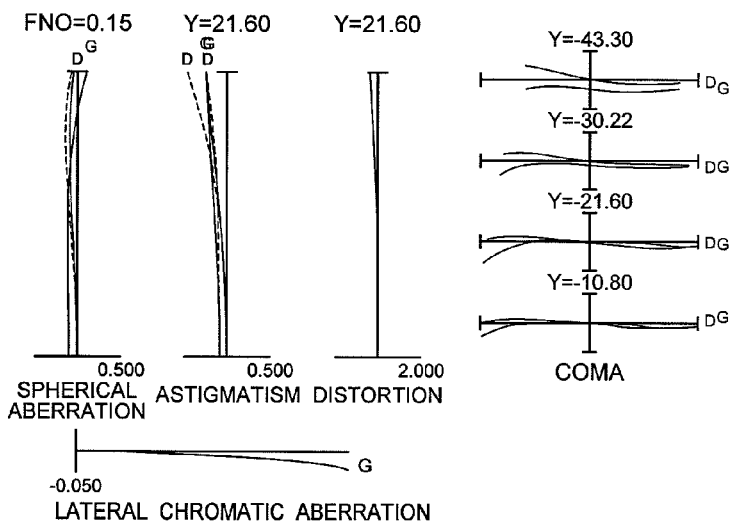
Figure 2C:
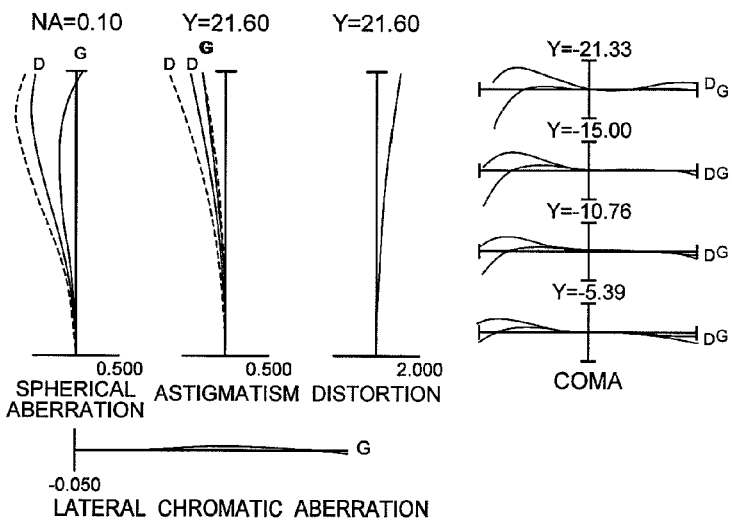

FIGS. 2A, 2B and 2C are graphs showing various aberrations of the imaging lens according to Example 1, in which FIG. 2A is upon focusing on infinity, FIG. 2B is upon focusing on an intermediate shooting distance (β=−0.5), and FIG. 2C is upon focusing on a closest shooting distance (β=−1.0).

In respective graphs, FNO denotes an f-number, NA denotes a numerical number, Y denotes an image height, and ω denotes a half angle of view (unit: degrees). In respective graphs, D denotes an aberration curve at d-line (wavelength λ=587.6 nm), and G denotes an aberration curve at g-line (wavelength λ=435.8 nm). In graphs showing astigmatism and distortion, the maximum value of the image height Y is shown. In graphs showing coma, value of each image height is shown. In the graph showing astigmatism, a solid line indicates a sagittal image plane, and a broken line indicates a meridional image plane. The above-described explanations regarding various aberration graphs are the same as the other Examples.

As is apparent from FIGS. 2A, 2B and 2C, the imaging lens according to Example 1 shows superb optical performance as a result of good corrections to various aberrations over entire focusing range from infinity to a close object.

Example 2

Figure 3:
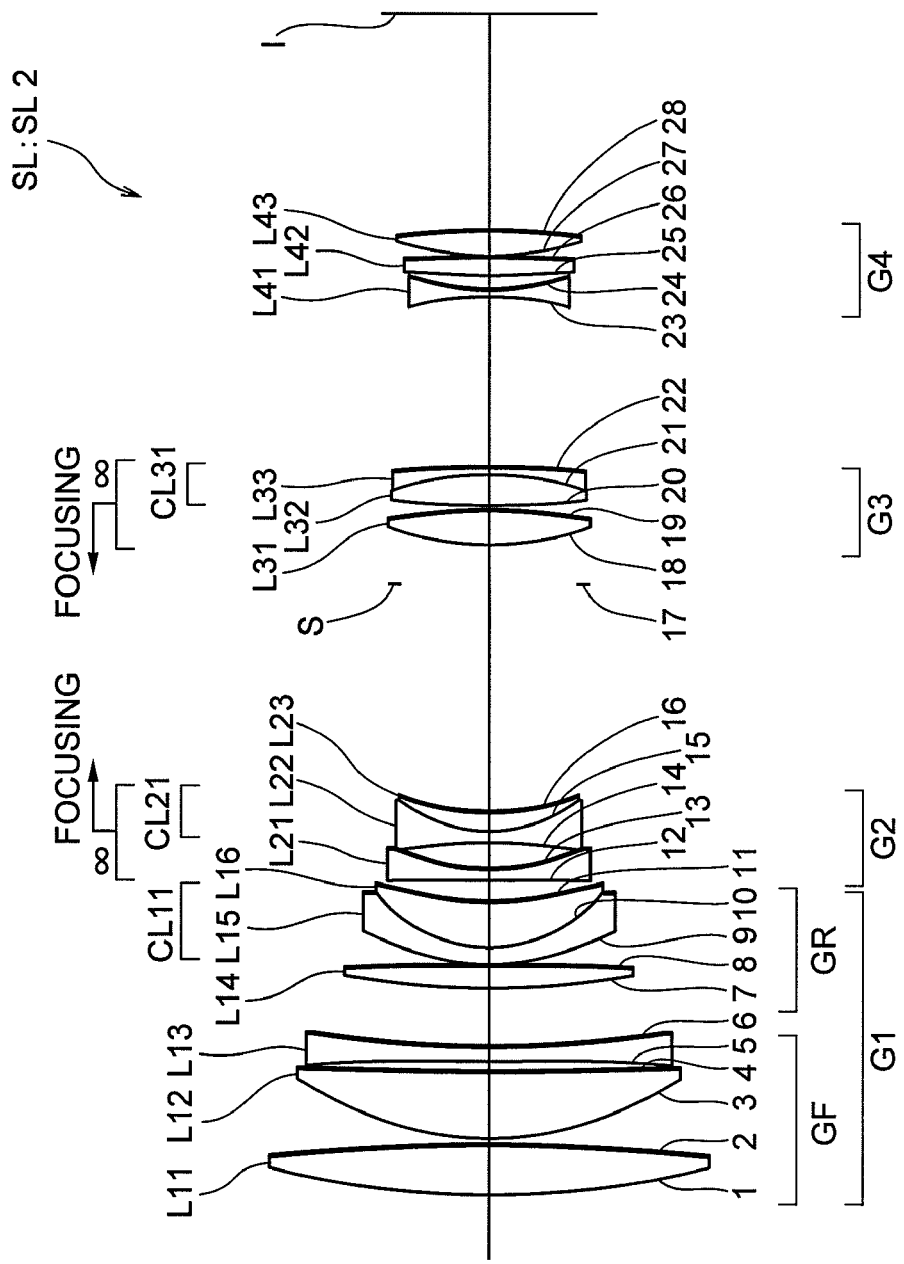
FIG. 3 is a sectional view showing a lens configuration of an imaging lens focusing on infinity according to Example 2 of the present application.

FIG. 3 is a sectional view showing a lens configuration of an imaging lens SL2 according to Example 2 of the present application focusing on infinity. In the imaging lens SL2 shown in FIG. 3, the first lens group G1 is composed of, in order from and object side, a double convex positive lens L11, a positive meniscus lens L12 having a convex surface facing the object side, a double concave negative lens L13, a double convex positive lens L14, and a cemented lens CL11 constructed by a negative meniscus lens L15 having a convex surface facing the object side cemented with a positive meniscus lens L16 having a convex surface facing the object side. The second lens group G2 is composed of, in order from the object side, a double concave negative lens L21, and a cemented lens CL 21 constructed by a double concave negative lens L22 cemented with a positive meniscus lens L23 having a convex surface facing the object side. The third lens group G3 is composed of, in order from the object side, a double convex positive lens L31, and a cemented lens CL 31 constructed by a double convex positive lens L32 cemented with a negative meniscus lens L33 having a convex surface facing the image side. The fourth lens group G4 is composed of, in order from the object side, a double concave negative lens L41, a double convex positive lens L42, and a double convex positive lens L43.

Various values associated with the imaging lens SL2 according to Example 2 are listed in Table 2.

TABLE 2

[Specifications]

f = 169.98735
FNO = 2.50

[Lens Data]

| i | r | d | vd | nd |
|---|---|---|---|---|
| 1 | 211.2162 | 10.5000 | 55.40 | 1.677900 |
| 2 | −384.5087 | 0.9043 | | |
| 3 | 74.2569 | 14.0000 | 82.52 | 1.497820 |
| 4 | 1721.7830 | 1.8085 | | |
| 5 | −789.7207 | 3.1649 | 35.04 | 1.749500 |
| 6 | 257.0044 | 11.8180 | | |
| 7 | 201.5450 | 5.0000 | 91.20 | 1.456000 |
| 8 | −760.5152 | 0.1000 | | |
| 9 | 60.3722 | 3.1649 | 41.17 | 1.701540 |
| 10 | 31.6491 | 10.0000 | 82.52 | 1.497820 |
| 11 | 89.1239 | (d11) | | |
| 12 | −649.9643 | 2.5319 | 65.44 | 1.603001 |
| 13 | 53.1965 | 5.0000 | | |
| 14 | −125.0621 | 2.4415 | 62.06 | 1.588245 |
| 15 | 33.6580 | 4.0000 | 25.43 | 1.805181 |
| 16 | 55.7399 | (d16) | | |
| 17 | ∞ | (d17) | Aperture Stop S | |
| 18 | 69.9907 | 7.5000 | 63.37 | 1.618000 |
| 19 | −104.2598 | 0.4521 | | |
| 20 | 211.9953 | 6.5106 | 91.20 | 1.456000 |
| 21 | −60.8154 | 1.6277 | 23.78 | 1.846660 |
| 22 | −195.3139 | (d22) | | |
| 23 | −66.8968 | 1.8085 | 35.04 | 1.749500 |
| 24 | 55.0000 | 2.8101 | | |
| 25 | 262.6091 | 3.8000 | 27.51 | 1.755199 |
| 26 | −543.4102 | 0.0904 | | |
| 27 | 66.7147 | 5.5000 | 25.43 | 1.805181 |
| 28 | −135.4887 | 43.9357 | | |

[Variable Distances]

| | INF | MID | CLD |
|---|---|---|---|
| β= | 0 | −0.5 | −1.0 |
| d0= | ∞ | 466.79610 | 297.31720 |
| d1= | 4.00001 | 26.37250 | 45.56607 |
| d16= | 46.56607 | 24.19357 | 5.00000 |
| d17= | 8.20000 | 3.90000 | 3.00000 |
| d22= | 34.70030 | 39.00030 | 39.90030 |
| Bf= | 43.93570 | 43.73004 | 44.50869 |
| TL= | 241.93545 | 241.72979 | 242.50844 |

[Values for Conditional Expressions]

β = −1.0
FNO = 2.42
f = 169.98735
f2 = −40.801
(1)((−β)/FNO) × (f/(−f2)) = 1.72
(2)nd1 = 1.678
(3)vd1 = 55.40
(4)vd2 = 82.52
(5)(−β) × (−f2) × FNo/f = 0.580
(6)fGF/fGR = 0.221

FIGS. 4A, 4B and 4C are graphs showing various aberrations of the imaging lens according to Example 2, in which FIG. 4A is upon focusing on infinity, FIG. 4B is upon focusing on an intermediate shooting distance (β=−0.5), and FIG. 4C is upon focusing on a closest shooting distance (β=−1.0).

As is apparent from FIGS. 4A, 4B and 4C, the imaging lens according to Example 2 shows superb optical performance as a result of good corrections to various aberrations over entire focusing range from infinity to a close object.

Example 3

Figure 5:
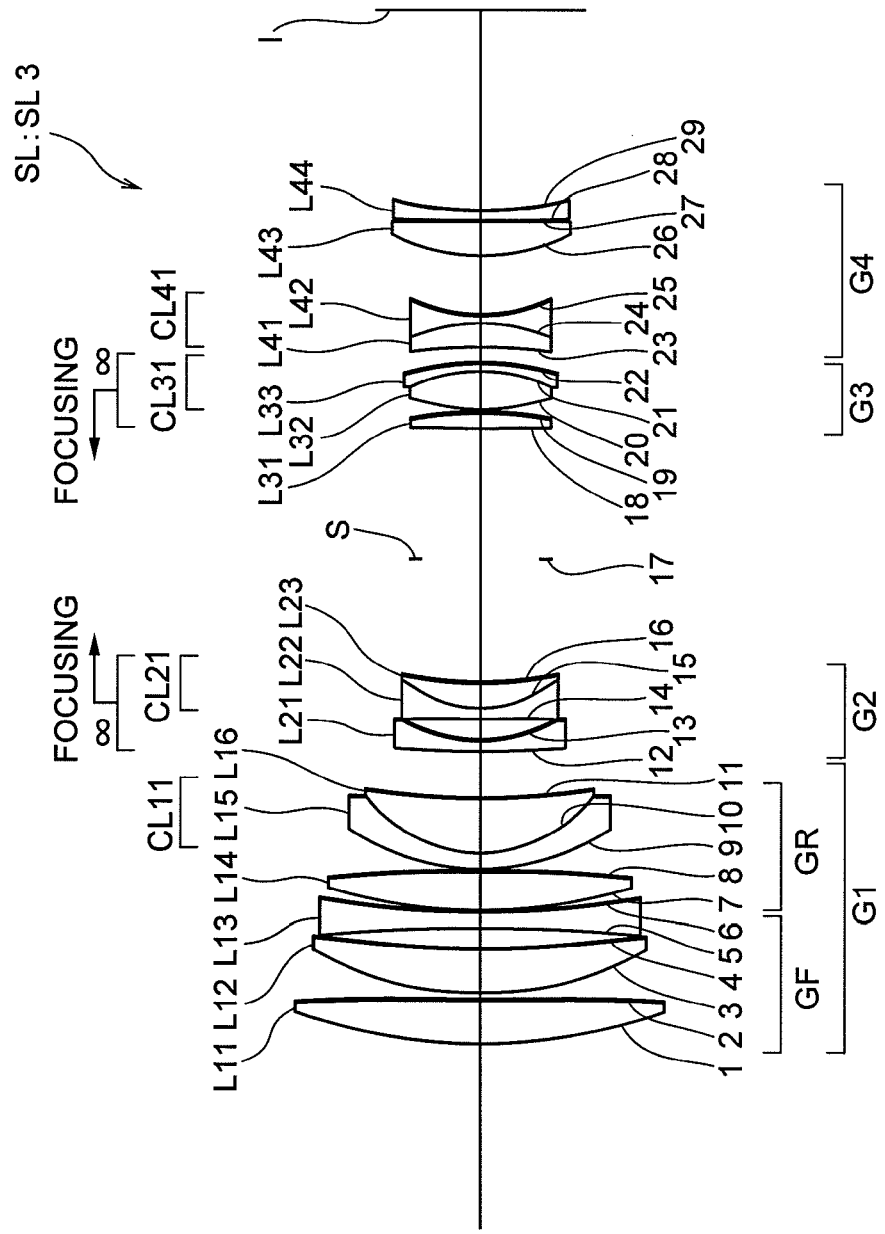
FIG. 5 is a sectional view showing a lens configuration of an imaging lens focusing on infinity according to Example 3 of the present application.

FIG. 5 is a sectional view showing a lens configuration of an imaging lens SL3 according to Example 3 of the present application focusing on infinity. In the imaging lens SL3 shown in FIG. 5, the first lens group G1 is composed of, in order from and object side, a double convex positive lens L11, a positive meniscus lens L12 having a convex surface facing the object side, a double concave negative lens L13, a double convex positive lens L14, and a cemented lens CL11 constructed by a negative meniscus lens L15 having a convex surface facing the object side cemented with a positive meniscus lens L16 having a convex surface facing the object side. The second lens group G2 is composed of, in order from the object side, a negative meniscus lens L21 having a convex surface facing the object side, and a cemented lens CL 21 constructed by a double concave negative lens L22 cemented with a positive meniscus lens L23 having a convex surface facing the object side. The third lens group G3 is composed of, in order from the object side, a positive meniscus lens L31 having a concave surface facing the object side, and a cemented lens CL 31 constructed by a double convex positive lens L32 cemented with a negative meniscus lens L33 having a convex surface facing the image side. The fourth lens group G4 is composed of, in order from the object side, a cemented lens CL 41 constructed by a positive meniscus lens L41 having a convex surface facing the image side cemented with a double concave negative lens L42, a double convex positive lens L43, and a double concave negative lens L44.

Various values associated with the imaging lens SL3 according to Example 3 are listed in Table 3.

TABLE 3

[Specifications]

f = 198.00003
FNO = 3.21

[Lens Data]

| i | r | d | vd | nd |
|---|---|---|---|---|
| 1 | 129.7596 | 9.3000 | 55.52 | 1.696797 |
| 2 | −731.2617 | 1.0000 | | |
| 3 | 76.9560 | 9.2000 | 82.52 | 1.497820 |
| 4 | 259.2427 | 4.2000 | | |
| 5 | −301.5232 | 3.5000 | 33.89 | 1.803840 |
| 6 | 206.8971 | 0.1000 | | |
| 7 | 118.7575 | 8.5000 | 82.52 | 1.497820 |
| 8 | −274.2081 | 0.1952 | | |
| 9 | 52.1747 | 3.5000 | 45.29 | 1.794997 |
| 10 | 31.0793 | 11.2000 | 82.52 | 1.497820 |
| 11 | 152.0694 | (d11) | | |
| 12 | 388.1555 | 2.5000 | 47.38 | 1.788001 |
| 13 | 34.2544 | 4.3000 | | |
| 14 | −296.4558 | 2.3000 | 60.29 | 1.620410 |
| 15 | 26.4313 | 5.5000 | 31.59 | 1.756920 |
| 16 | 96.9634 | (d16) | | |
| 17 | ∞ | (d17) | Aperture Stop S | |
| 18 | −1970.5204 | 3.5000 | 82.52 | 1.497820 |
| 19 | −78.6469 | 0.5000 | | |
| 20 | 50.2171 | 8.0000 | 82.52 | 1.497820 |
| 21 | −32.7001 | 1.8000 | 33.89 | 1.803840 |
| 22 | −56.2120 | (d22) | | |
| 23 | −106.7266 | 5.0000 | 25.68 | 1.784723 |
| 24 | −34.9543 | 1.8000 | 55.48 | 1.638540 |
| 25 | 35.7172 | 12.3237 | | |
| 26 | 45.5316 | 7.0000 | 46.57 | 1.804000 |
| 27 | −1028.7209 | 0.5000 | | |
| 28 | −1610.3480 | 2.0000 | 23.78 | 1.846660 |
| 29 | 85.1001 | 41.2322 | | |

[Variable Distances]

| | INF | MID | CLD |
|---|---|---|---|
| β= | 0 | −0.5 | −1.0 |
| d0= | ∞ | 385.26190 | 238.37790 |
| d11= | 9.72009 | 19.44212 | 30.03625 |
| d16= | 25.44056 | 15.71854 | 5.12440 |
| d17= | 27.52794 | 12.21742 | 1.81442 |
| d22= | 3.05288 | 18.36340 | 28.76640 |
| Bf= | 41.23220 | 41.26834 | 41.23514 |
| TL= | 214.69255 | 214.72869 | 214.69549 |

[Values for Conditional Expressions]

β = −1.0
FNO = 3.21
f = 198.00003
f2 = −37.640
(1)((−β)/FNO) × (f/(−f2)) = 1.64
(2)nd1 = 1.697
(3)vd1 = 55.52
(4)vd2 = 82.52
(5)(−β) × (−f2) × FNo/f = 0.609
(6)fGF/fGR = 1.690

Figure 6A:
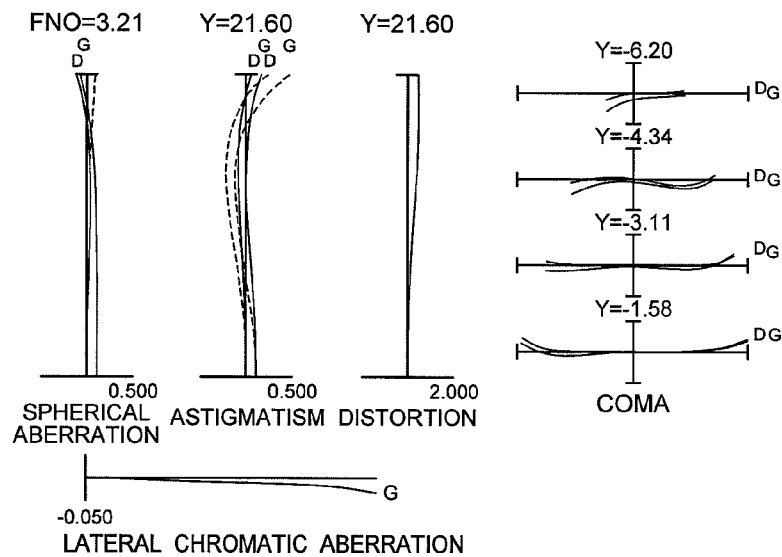
Figure 6B:
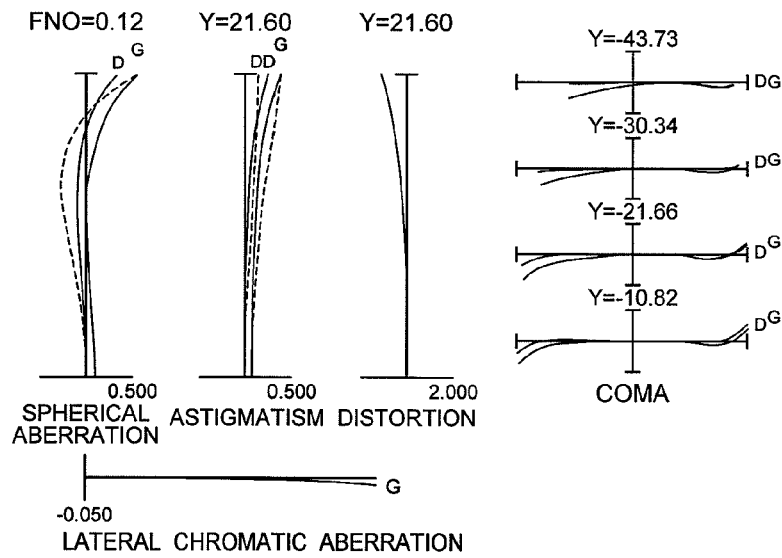
Figure 6C:
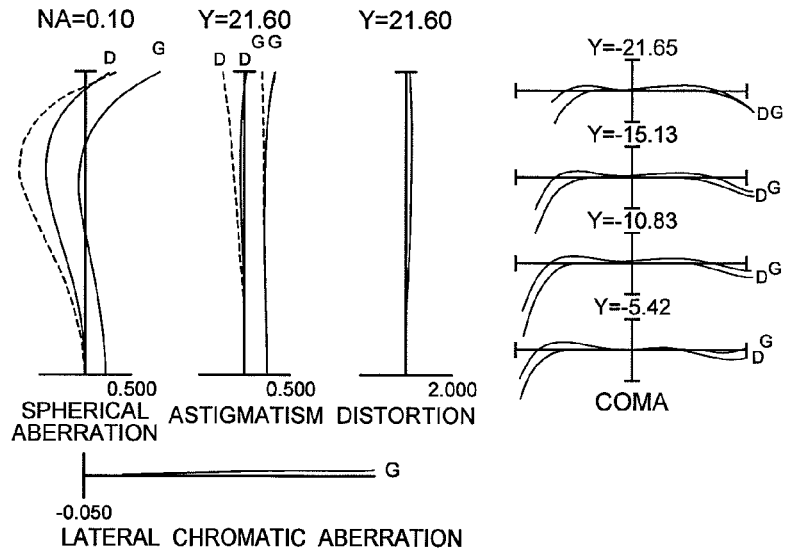

FIGS. 6A, 6B and 6C are graphs showing various aberrations of the imaging lens according to Example 3, in which FIG. 6A is upon focusing on infinity, FIG. 6B is upon focusing on an intermediate shooting distance (β=−0.5), and FIG. 6C is upon focusing on a closest shooting distance (β=−1.0).

As is apparent from FIGS. 6A, 6B and 6C, the imaging lens according to Example 3 shows superb optical performance as a result of good corrections to various aberrations over entire focusing range from infinity to a close object.

Example 4

FIG. 7 is a sectional view showing a lens configuration of an imaging lens SL4 according to Example 4 of the present application focusing on infinity. In the imaging lens SL4 shown in FIG. 7, the first lens group G1 is composed of, in order from and object side, a double convex positive lens L11, a positive meniscus lens L12 having a convex surface facing the object side, a double concave negative lens L13, a double convex positive lens L14, and a cemented lens CL11 constructed by a negative meniscus lens L15 having a convex surface facing the object side cemented with a positive meniscus lens L16 having a convex surface facing the object side. The second lens group G2 is composed of, in order from the object side, a double concave negative lens L21, and a cemented lens CL 21 constructed by a double concave negative lens L22 cemented with a positive meniscus lens L23 having a convex surface facing the object side. The third lens group G3 is composed of, in order from the object side, a double convex positive lens L31, and a cemented lens CL 31 constructed by a double convex positive lens L32 cemented with a negative meniscus lens L33 having a convex surface facing the image side. The fourth lens group G4 is composed of, in order from the object side, a double concave negative lens L41, a double convex positive lens L42, and a double concave negative lens L43.

Various values associated with the imaging lens SL4 according to Example 4 are listed in Table 4.

TABLE 4

[Specifications]

f = 219.98771
FNO = 2.04

[Lens Data]

| i | r | d | vd | nd |
|---|---|---|---|---|
| 1 | 258.3171 | 15.0000 | 54.66 | 1.729157 |
| 2 | −463.5027 | 0.3000 | | |
| 3 | 118.3970 | 16.0000 | 67.90 | 1.593190 |
| 4 | 911.5383 | 3.8000 | | |
| 5 | −639.7392 | 3.8506 | 32.35 | 1.850260 |
| 6 | 223.5223 | 9.1199 | | |
| 7 | 125.4664 | 12.8000 | 91.20 | 1.456000 |
| 8 | −684.1438 | 0.1594 | | |
| 9 | 92.1119 | 3.8506 | 47.38 | 1.788001 |
| 10 | 49.9130 | 14.5000 | 82.52 | 1.497820 |
| 11 | 210.9790 | (d11) | | |
| 12 | −4316.8254 | 3.0805 | 55.52 | 1.696797 |
| 13 | 81.5657 | 5.6000 | | |
| 14 | −477.8628 | 2.9704 | 55.52 | 1.696797 |
| 15 | 45.3786 | 7.5000 | 23.78 | 1.846660 |
| 16 | 85.1484 | (d16) | | |
| 17 | ∞ | (d17) | Aperture Stop S | |
| 18 | 146.1050 | 6.5000 | 82.52 | 1.497820 |
| 19 | −134.0472 | 0.3000 | | |
| 20 | 96.7435 | 12.0000 | 65.46 | 1.603001 |
| 21 | −60.5750 | 1.9803 | 35.04 | 1.749500 |
| 22 | −183.0858 | (d22) | | |
| 23 | −118.1879 | 2.2003 | 30.13 | 1.698950 |
| 24 | 50.6161 | 10.7983 | | |
| 25 | 84.1488 | 11.5000 | 35.04 | 1.749500 |
| 26 | −60.1396 | 0.1100 | | |

TABLE 4-continued

| 27 | −71.7556 | 2.2003 | 70.45 | 1.487490 |
| 28 | 444.5196 | 58.6015 | | |

[Variable Distances]

| | INF | MID | CLD |
|---|---|---|---|
| β= | 0 | −0.5 | −1.0 |
| d0= | ∞ | 461.83610 | 310.25050 |
| d11= | 8.93482 | 32.30173 | 53.30294 |
| d16= | 48.67817 | 25.31126 | 4.31005 |
| d17= | 38.99927 | 18.58195 | 3.58851 |
| d22= | 9.87060 | 30.28791 | 45.28135 |
| Bf= | 58.60150 | 58.51021 | 57.65735 |
| TL= | 311.20498 | 311.11369 | 310.26083 |

[Values for Conditional Expressions]

β = −1.0
FNO = 2.04
f = 219.98771
f2 = −56.841
(1)((−β)/FNO) × (f/(−f2)) = 1.90
(2)nd1 = 1.729
(3)vd1 = 54.66
(4)vd2 = 91.20
(5)(−β) × (−f2) × FNo/f = 0.527
(6)fGF/fGR = 1.152

Figure 8A:
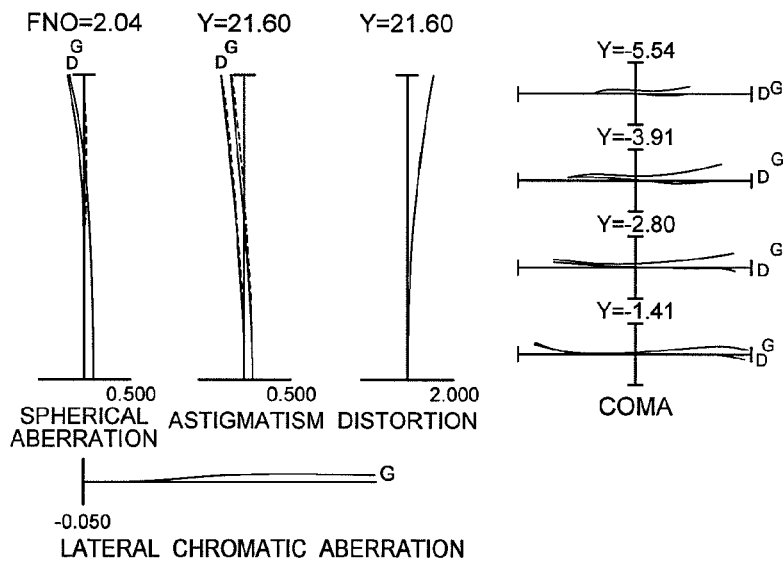
Figure 8B:
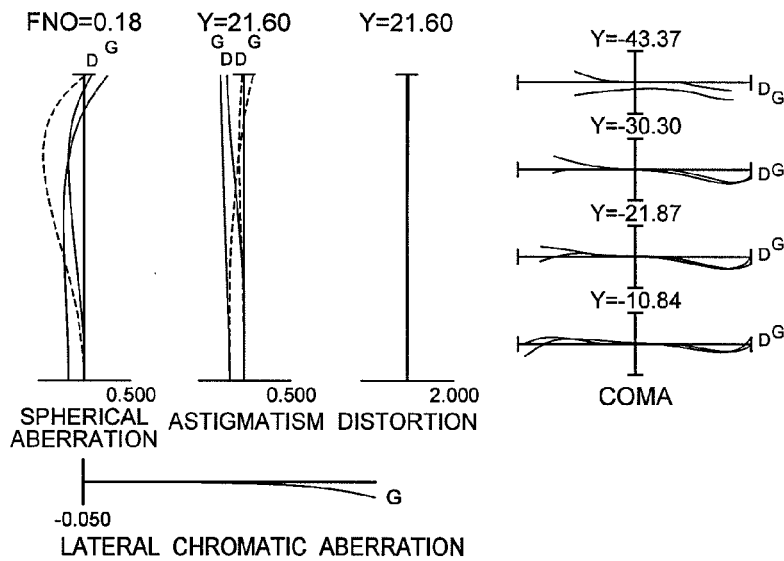
Figure 8C:
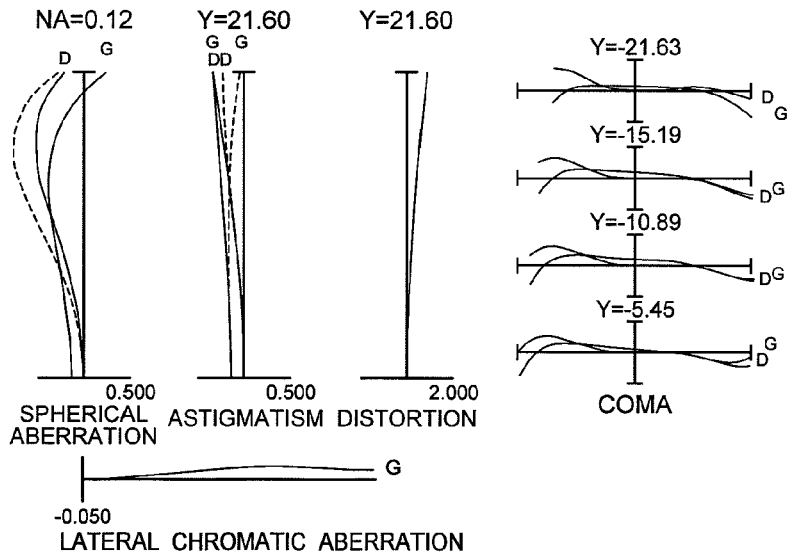

FIGS. 8A, 8B and 8C are graphs showing various aberrations of the imaging lens according to Example 4, in which FIG. 8A is upon focusing on infinity, FIG. 8B is upon focusing on an intermediate shooting distance (β=−0.5), and FIG. 8C is upon focusing on a closest shooting distance (β=−1.0).

As is apparent from FIGS. 8A, 8B and 8C, the imaging lens according to Example 4 shows superb optical performance as a result of good corrections to various aberrations over entire focusing range from infinity to a close object.

Example 5

FIG. 9 is a sectional view showing a lens configuration of an imaging lens SL5 according to Example 5 of the present application focusing on infinity. In the imaging lens SL5 shown in FIG. 9, the first lens group G1 is composed of, in order from and object side, a double convex positive lens L11, positive meniscus lens L12 having a convex surface facing the object side, a double concave negative lens L13, a positive meniscus lens L14 having a convex surface facing the object side, and a cemented lens CL11 constructed by a negative meniscus lens L15 having a convex surface facing the object side cemented with a positive meniscus lens L16 having a convex surface facing the object side. The second lens group G2 is composed of, in order from the object side, a negative meniscus lens L21 having a convex surface facing the object side, and a cemented lens CL 21 constructed by a double concave negative lens L22 cemented with a positive meniscus lens L23 having a convex surface facing the object side. The third lens group G3 is composed of, in order from the object side, a double convex positive lens L31, and a cemented lens CL 31 constructed by a double convex positive lens L32 cemented with a negative meniscus lens L33 having a convex surface facing the image side. The fourth lens group G4 is composed of, in order from the object side, a double concave negative lens L41, a double convex positive lens L42, and a double concave negative lens L43.

Various values associated with the imaging lens SL5 according to Example 5 are listed in Table 5.

TABLE 5

[Specifications]

f = 160.01928
FNO = 2.87

[Lens Data]

| i | r | d | vd | nd |
|---|---|---|---|---|
| 1 | 189.3966 | 11.5000 | 65.47 | 1.603000 |
| 2 | −256.5570 | 0.2182 | | |
| 3 | 66.3234 | 14.0000 | 91.38 | 1.456000 |
| 4 | 488.9346 | 2.5000 | | |
| 5 | −800.0000 | 3.5000 | 32.35 | 1.850260 |
| 6 | 181.6514 | 7.0000 | | |
| 7 | 76.7085 | 7.0000 | 82.56 | 1.497820 |
| 8 | 477.4907 | 0.1000 | | |
| 9 | 44.6509 | 2.8004 | 47.38 | 1.788000 |
| 10 | 27.8882 | 11.5000 | 91.20 | 1.456000 |
| 11 | 140.9438 | (d11) | | |
| 12 | 177.9173 | 2.2404 | 57.34 | 1.670000 |
| 13 | 37.6470 | 4.5000 | | |
| 14 | −235.9017 | 2.1603 | 55.52 | 1.696797 |
| 15 | 29.1580 | 4.4442 | 23.78 | 1.846660 |
| 16 | 58.5189 | (d16) | | |
| 17 | ∞ | (d17) | Aperture Stop S | |
| 18 | 84.6544 | 4.5000 | 82.52 | 1.497820 |
| 19 | −66.7276 | 0.2182 | | |
| 20 | 56.2011 | 8.0000 | 82.52 | 1.497820 |
| 21 | −43.4875 | 1.4402 | 35.04 | 1.749500 |
| 22 | −113.1902 | (d22) | | |
| 23 | −88.9707 | 2.0000 | 32.11 | 1.672700 |
| 24 | 38.1868 | 5.0000 | | |
| 25 | 53.0515 | 10.0000 | 34.96 | 1.801000 |
| 26 | −43.0712 | 0.5000 | | |
| 27 | −45.8497 | 1.6003 | 65.47 | 1.603000 |
| 28 | 76.3227 | 37.2903 | | |

[Variable Distances]

| | INF | MID | CLD |
|---|---|---|---|
| β= | 0 | −0.5 | −1.0 |
| d0= | ∞ | 309.71390 | 196.91690 |
| d11= | 1.43518 | 13.21354 | 25.04256 |
| d16= | 26.05596 | 14.27760 | 2.44858 |
| d17= | 29.17815 | 15.21786 | 5.25829 |
| d22= | 2.24602 | 16.20631 | 26.16588 |
| Bf= | 37.29034 | 37.42219 | 37.29068 |
| TL= | 202.92784 | 203.05973 | 202.92822 |

[Values for Conditional Expressions]

β = −1.0
FNO = 2.87
f = 160.01928
f2 = −36.317
(1)((−β)/FNO) × (f/(−f2)) = 1.54
(2)nd1 = 1.603
(3)vd1 = 65.47
(4)vd2 = 91.38
(5)(−β) × (−f2) × FNo/f = 0.651
(6)fGF/fGR = 1.301

Figure 10A:
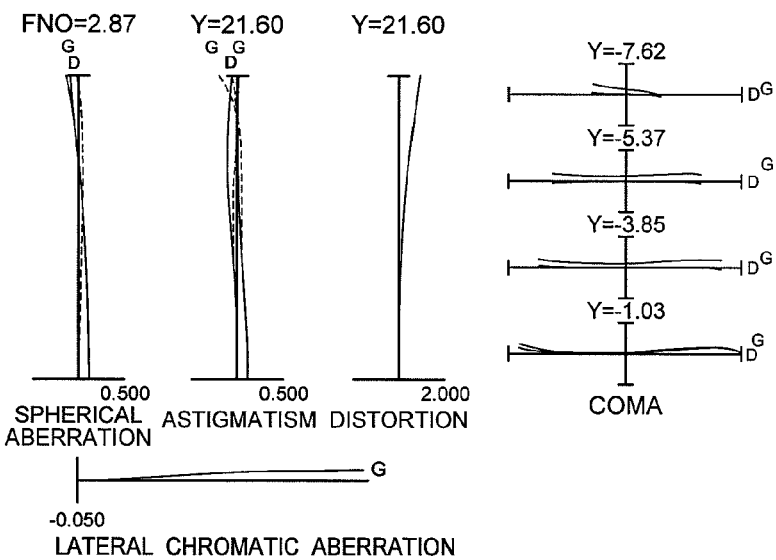
Figure 10B:
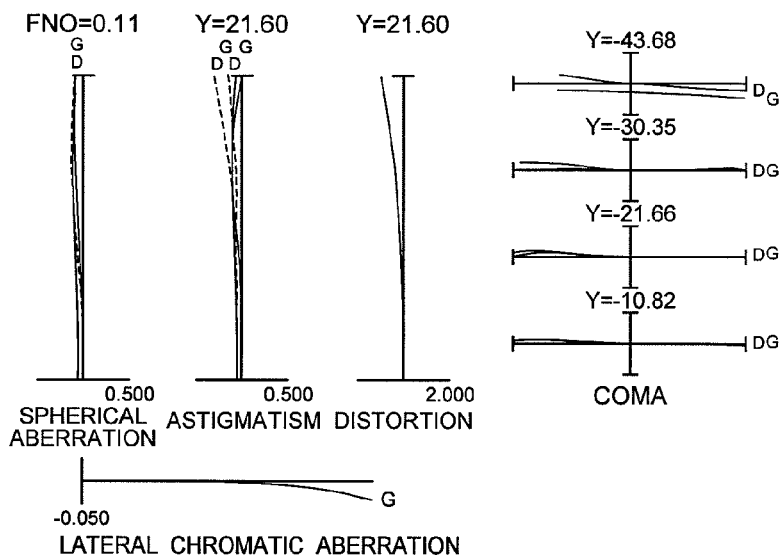
Figure 10C:
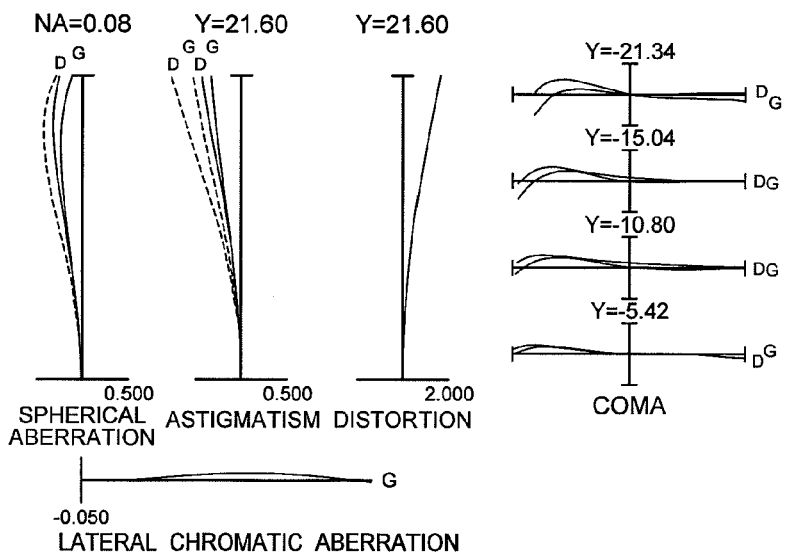

FIGS. 10A, 10B and 10C are graphs showing various aberrations of the imaging lens according to Example 5, in which FIG. 10A is upon focusing on infinity, FIG. 10B is upon focusing on an intermediate shooting distance (β=−0.5), and FIG. 10C is upon focusing on a closest shooting distance (β=−1.0).

As is apparent from FIGS. 10A, 10B and 10C, the imaging lens according to Example 5 shows superb optical performance as a result of good corrections to various aberrations over entire focusing range from infinity to a close object.

Incidentally, the following description may suitably be applied within limits that do not deteriorate optical performance.

Although an imaging lens with a four-lens-group configuration is shown as each Example of the present application, the lens-group configuration according to the present application is not limited to this, other lens-group configurations such as a five-lens-group configuration or a six-lens-group configuration is possible. Moreover, a lens configuration that a lens or a lens group is added to the object side thereof is possible, and a lens configuration that a lens or a lens group is added to the image side thereof is also possible. Incidentally, a lens group means a portion that includes at least one lens and is separated by air spaces that vary upon focusing.

In an imaging lens according to the present application, a lens group or a portion of a lens group may be shifted in a direction including a component perpendicular to the optical axis as a vibration reduction lens group, or tilted (swayed) in a direction including the optical axis for correcting an image blur caused by a camera shake. In an imaging lens according to the present application, it is particularly preferable that at least a portion of the fourth lens group G4 is used as a vibration reduction lens group.

A lens surface of a lens composing an imaging lens according to the present application may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In an imaging lens according to the present application, although an aperture stop is preferably provided between the second lens group G2 and the third lens group G3, the function may be substituted by a lens frame without disposing a member as an aperture stop.

An antireflection coating having high transmittance over a broad wavelength range may be applied to each lens surface of an imaging lens according to the present application to reduce flare or ghost images, so that high optical performance with high contrast can be attained.

In an imaging lens SL according to the present application, the first lens group G1 preferably includes three positive lens components and one negative lens component. The first lens group G1 preferably disposes these lens components, in order from the object side, positive-positive-negative-positive with an air space between each of them.

In an imaging lens SL according to the present application, the second lens group G2 preferably includes two negative lens components. In an imaging lens SL according to the present application, the third lens group G3 preferably includes two positive lens components.

In an imaging lens SL according to the present application, the fourth lens group G4 preferably includes one positive lens component and one negative lens component. The fourth lens group G4 preferably disposes these lens components, in order from the object side, negative-positive with an air space between each of them.

Above-described each example only shows a specific example for the purpose of better understanding of the present invention. Accordingly, it is needless to say that the invention in its broader aspect is not limited to the specific details and representative devices shown and described herein.

What is claimed is:

1. An imaging lens comprising, in order from an object side:
    a first lens group having positive refractive power;
    a second lens group having negative refractive power;
    a third lens group having positive refractive power; and
    a fourth lens group having negative refractive power;
    the second lens group and the third lens group moving along an optical axis upon focusing from infinity to a close object, and
    the following conditional expression being satisfied:

$$1.20<((-\beta)/FNO)\times(f/(-f2))<3.00$$

where β (negative) denotes an available shooting magnification whose absolute value gives the maximum value, f denotes a focal length of the imaging lens, FNO denotes an f-number, and f2 denotes a focal length of the second lens group.

2. The imaging lens according to claim 1, wherein the first lens group includes an object side positive lens disposed to the most object side, and the following conditional expressions being satisfied:

$$1.565<nd1$$

$$45.0<vd1$$

where nd1 denotes a refractive index of the object side positive lens at d-line (wavelength λ=587.6 nm), and vd1 denotes an Abbe number of the object side positive lens at d-line.

3. The imaging lens according to claim 2, wherein the first lens group includes at least one image side positive lens having positive refractive power disposed to an image side of the object side positive lens, and the following conditional expression is satisfied:

$$79.0<vd2$$

where vd2 denotes an Abbe number of each of the image side positive lens.

4. The imaging lens according to claim 3, wherein the first lens group has at least one lens that is disposed second or later in order from the object side and is the image side positive lens.

5. The imaging lens according to claim 3, wherein the second lens counted in order from the object side of the first lens group is the image side positive lens.

6. The imaging lens according to claim 4, wherein the first lens group includes two image side positive lenses.

7. The imaging lens according to claim 1, wherein the first lens group includes at least one cemented lens.

8. The imaging lens according to claim 7, wherein the cemented lens includes a positive lens and a negative lens.

9. The imaging lens according to claim 1, wherein the first lens group includes, in order from the object side, a first lens having positive refractive power, a second lens group having positive refractive power, a third lens group having negative refractive power, a fourth lens group having positive refractive power, a fifth lens group having negative refractive power, and a sixth lens group having positive refractive power.

10. The imaging lens according to claim 9, wherein the following conditional expression is satisfied:

$$0.15 < fGF/fGR < 2.00$$

where fGF denotes a focal length of a front lens group, and fGR denotes a focal length of a rear lens group, in which the front lens group includes the first lens, the second lens, and the third lens in the first lens group, and the rear lens group includes the fourth lens, the fifth lens, and sixth lens in the first lens group.

11. An optical apparatus including the imaging lens according to claim 1.

12. A method for manufacturing an imaging lens including, in order from an object side, a first lens group having positive refractive power, a second lens group having negative refractive power, a third lens group having positive refractive power, and a fourth lens group having negative refractive power, the method comprising steps of:
  disposing the second lens group and the third lens group movable along an optical axis upon focusing from infinity to a close object; and
  disposing each lens group with satisfying the following conditional expression:

$$1.20 < ((-\beta)/FNO) \times (f/(-f2)) < 3.00$$

where β (negative) denotes an available shooting magnification whose absolute value gives the maximum value, f denotes a focal length of the imaging lens, FNO denotes an f-number, and f2 denotes a focal length of the second lens group.

13. The method according to claim 12, further comprising a step of:
  disposing an object side positive lens having positive refractive power to the most object side in the first lens group with satisfying the following conditional expressions:

$$1.565 < nd1$$

$$45.0 < vd1$$

where nd1 denotes a refractive index of the object side positive lens at d-line (wavelength λ=587.6 nm), and vd1 denotes an Abbe number of the object side positive lens at d-line.

14. The method according to claim 13, further comprising a step of:
  disposing at least one image side positive lens having positive refractive power to the image side of the object side positive lens in the first lens group with satisfying the following conditional expression:

$$79.0 < vd2$$

where vd2 denotes an Abbe number of each of the image side positive lens.

15. The method according to claim 14, further comprising a step of:
  disposing at least one image side positive lens to the second or later in order from the object side in the first lens group.

16. The method according to claim 14, further comprising a step of:
  disposing the image side positive lens to the second, in order from the object side, of the first lens group.

17. The method according to claim 15, further comprising a step of:
  disposing two image side positive lens in the first lens group.

18. The method according to claim 12, further comprising a step of:
  disposing at least one cemented lens in the first lens group.

19. The method according to claim 18, further comprising a step of:
  disposing a positive lens and a negative lens in the cemented lens.

20. The method according to claim 12, further comprising a step of:
  disposing, in order from the object side, a first lens having positive refractive power, a second lens having positive refractive power, a third lens having negative refractive power, a fourth lens having positive refractive power, a fifth lens having negative refractive power, and a sixth lens having positive refractive power in the first lens group.

21. The method according to claim 20, further comprising a step of:
  satisfying the following conditional expression:

$$0.15 < fGF/fGR < 2.00$$

where fGF denotes a focal length of a front lens group, and fGR denotes a focal length of a rear lens group, in which the front lens group includes the first lens, the second lens, and the third lens in the first lens group, and the rear lens group includes the fourth lens, the fifth lens, and sixth lens in the first lens group.

* * * * *